Patented Mar. 23, 1943

2,314,824

UNITED STATES PATENT OFFICE 2,314,824

METHOD OF MAKING GLASS ARTICLES

Charles H. Greene, Corning, N. Y., assignor to Corning Glass Works, Corning, N. Y., a corporation of New York No Drawing. Application March 1, 1940,
Serial No. 321,789

4 Claims. (Cl. 49—77)

This invention relates to glass and to methods of making articles thereof. For some purposes glass articles have been made by shaping and firing powdered glass to a temperature which will cause sintering or incipient fusion of the particles. The air in the interstices between the particles becomes entrapped as the particles coalesce and the countless bubbles or seeds which are formed thereby make the articles opaque or translucent.

It is an object of this invention to produce transparent articles of glass by sintering shaped articles formed of the powdered glass.

My invention is predicated on my discovery that when such an article is fired at sintering temperatures in an atmosphere of steam the bubbles are eliminated and a substantially transparent article results.

I have further found that high silica glasses, such as those produced by the process disclosed in Patent No. 2,106,744 which are particularly difficult to sinter, can also be treated in like manner to produce substantially transparent articles therefrom.

Consequently another object of the invention is to utilize broken ware and scrap glass which may result as a by-product in the practice of the process disclosed in said patent and which might otherwise be wasted.

As a further embodiment of my invention, finely divided silica, particularly finely divided amorphous silica, can be shaped and fired to a substantially transparent article of pure silica glass by my process.

In practicing the invention the glass, previously ground to a fine state of subdivision, or the finely divided silica, as the case may be, is molded to the desired shape by slip casting or ramming or dry pressing under high pressure or by other known means. The molded article after being dried in the usual manner is heated in an oven, preferably of the muffle type, to the sintering temperature and a jet of steam is passed continuously into the oven during firing so as to displace the air therein. The resulting article will be substantially transparent and may be annealed in the usual manner if desired.

The glasses disclosed in the above mentioned patent are made by melting and fabricating a glass, heat treating the fabricated glass to separate it into two phases throughout its mass and leaching the heat treated glass in an acid bath to dissolve out one of the phases. The details of that process, which are fully disclosed in the patent and will not be repeated here, show that the leached glass is porous and may subsequently be fired to a non-porous glass. For the present purpose I prefer to use the porous leached glass which, when pulverized, molded and fired to the sintering temperature in an atmosphere of steam, results in a transparent glass article. In firing articles made of such porous leached material, the following precautions are to be observed. Too slow firing in an atmosphere of steam tends to cause devitrification. On the other hand if the temperature in firing is increased rapidly enough to avoid devitrification, then cracking of the article may result. The difficulty is overcome by first heating the article in air to near the sintering temperature after which the sintering may be conducted rapidly in an atmosphere of steam. The said nonporous glass also exhibits at least some of the benefits of my invention when treated by my process and will produce articles which are substantially free from fine seeds and coarser bubbles.

I claim:

1. Method of making glass articles, which includes finely pulverizing glass, molding the pulverized glass to shape and sintering the shaped mass to a transparent article in an atmosphere of steam at atmospheric pressure.

2. Method of making glass articles, which includes molding finely divided silica to shape and sintering the shaped mass to a transparent article in an atmosphere of steam at atmospheric pressure.

3. Method of making glass articles which includes finely pulverizing glass, molding the pulverized glass to shape, heating the shaped article in air near its sintering temperature and thereafter sintering the shaped article to transparency in an atmosphere of steam at atmospheric pressure.

4. Method of making glass articles which includes molding finely divided silica to shape, heating the shaped article in air near its sintering temperature and thereafter sintering the shaped article to transparency in an atmosphere of steam at atmospheric pressure.

CHARLES H. GREENE.